United States Patent
Jaska et al.

(10) Patent No.: US 9,559,969 B2
(45) Date of Patent: Jan. 31, 2017

(54) SOURCE-AWARE NETWORK SHAPING

(71) Applicant: ViaSat, Inc., Carlsbad, CA (US)

(72) Inventors: Kristi Jaska, Encinitas, CA (US); James Esserman, La Jolla, CA (US)

(73) Assignee: ViaSat Inc., Carlsbed, CA (US)

( * ) Notice: Subject to any disclaimer, the term of this patent is extended or adjusted under 35 U.S.C. 154(b) by 234 days.

(21) Appl. No.: 14/251,471

(22) Filed: Apr. 11, 2014

(65) Prior Publication Data

US 2015/0016253 A1     Jan. 15, 2015

Related U.S. Application Data

(60) Provisional application No. 61/845,241, filed on Jul. 11, 2013.

(51) Int. Cl.
  *H04L 12/815* (2013.01)
  *H04L 12/801* (2013.01)
  *H04L 12/851* (2013.01)

(52) U.S. Cl.
  CPC ............... *H04L 47/22* (2013.01); *H04L 47/12* (2013.01); *H04L 47/24* (2013.01)

(58) Field of Classification Search
  None
  See application file for complete search history.

(56) References Cited

U.S. PATENT DOCUMENTS

| | | |
|---|---|---|
| 7,606,147 B2 | 10/2009 | Luft et al. |
| 7,650,379 B2 | 1/2010 | Hart et al. |
| 8,264,965 B2 | 9/2012 | Dolganow et al. |
| 8,335,161 B2 | 12/2012 | Foottit et al. |
| 2002/0163887 A1* | 11/2002 | Suni .................... H04L 12/5602 370/232 |
| 2008/0212470 A1 | 9/2008 | Castaneda et al. |
| 2012/0005368 A1* | 1/2012 | Knittle ............. H04N 21/23439 709/235 |

(Continued)

FOREIGN PATENT DOCUMENTS

WO         2012175145         12/2012

OTHER PUBLICATIONS

Will E. Leland, Window-Based Congestion Management in Broadband ATM Networks: the Performance of Three Access-Control Policies, 9 Pages.

*Primary Examiner* — Brandon Renner
(74) *Attorney, Agent, or Firm* — Marsh Fischmann & Breyfogle LLP; Daniel J. Sherwinter

(57) ABSTRACT

Systems and methods are described for source-aware shaping of network traffic in a communications system. Embodiments can manage resource congestion within a communications network by preferentially adjusting certain types of traffic on a per-subscriber and/or per-application basis. For example, a subscriber can receive various types of traffic in respective streams, and the streams can be identified according to whether they carry adaptive traffic. When a congestion condition is detected, one or more of the identified streams can be squeezed or expanded, which can cause an associated content source to automatically adapt communication of the adaptive traffic (e.g., its quality) to the reduced or expanded capacity. Selectively squeezing those streams identified as adaptive can appreciably mitigate congestion, while maintaining a desired level of network performance for the subscriber.

37 Claims, 6 Drawing Sheets

(56) References Cited

U.S. PATENT DOCUMENTS

| | | |
|---|---|---|
| 2012/0327779 A1 | 12/2012 | Gell et al. |
| 2013/0163430 A1* | 6/2013 | Gell ................. H04N 21/23439 370/235 |
| 2014/0161050 A1* | 6/2014 | Grinshpun .......... H04L 65/4069 370/329 |
| 2014/0219082 A1* | 8/2014 | Geijer Lundin ........ H04L 47/12 370/229 |
| 2015/0012707 A1* | 1/2015 | Li ....................... H04L 67/2885 711/122 |
| 2015/0341812 A1* | 11/2015 | Dion .................... H04W 24/08 370/252 |

\* cited by examiner

SOURCE-AWARE NETWORK SHAPING

FIELD

Embodiments relate generally to communications systems, and, more particularly, to source-aware shaping of network traffic in communications systems.

BACKGROUND

Communications infrastructures have limited bandwidth resources. As more people are consuming media over the Internet, these resources are in increasing demand. Accordingly, it is often desirable for communications providers to find ways to satisfy their subscribers' demands for media within the confines of limited bandwidth resources. In some cases, it is further desirable to maintain this subscriber satisfaction even as levels of congestion on the network change, which can manifest as changing amounts of available bandwidth resources.

BRIEF SUMMARY

Among other things, systems and methods are described for source-aware shaping of network traffic in a communications system. Embodiments can manage resource congestion within a communications network by preferentially adjusting certain types of traffic on a per-subscriber and/or per-application basis. For example, during periods of network congestion, certain types of traffic classified as adaptive (e.g., adaptive bit rate video) can be forced to lower quality to reduce overall network load without impacting other types of traffic (e.g., web browsing) at all or to the same extent. According to one illustrative implementation, a subscriber can receive various types of traffic in respective streams, and the streams can be identified according to whether they carry adaptive traffic. When a congestion condition is detected, one or more of the identified streams can be "squeezed" (e.g., by reducing capacity allocated to the stream), which can cause an associated content source to automatically adapt communication of the adaptive traffic to the reduced capacity (e.g., by communicating as a lower bit rate). Selectively squeezing those streams identified as adaptive can appreciably mitigate congestion, while maintaining a desired level of network performance for the subscriber.

According to one set of embodiments, a system is provided for network traffic shaping. The system includes: a number of stream pipes that each operates to carry network traffic of an associated traffic type from a content source to one or more subscriber terminals via a communications network; and a gateway, communicatively coupled with the stream pipes and disposed in the communications network between the content source and the subscriber terminals. The gateway includes: a congestion management system that operates to detect a congestion condition on the communications network and to identify a subset of the plurality of stream pipes as carrying adaptive traffic that is encoded in such a way that automatically adapts to throughput of its stream pipe; and a traffic shaping system that is communicatively coupled with the congestion management system and operates to adjust usage of shared network resources of the identified subset of stream pipes in response to detecting the congestion condition.

According to another set of embodiments, a method is provided for network traffic shaping. The method includes: detecting a congestion condition on at least one of a number of stream pipes that each operates to carry network traffic of an associated traffic type from a content source to one or more subscriber terminals via a communications network; identifying a subset of the stream pipes as carrying adaptive traffic that is encoded in such a way that automatically adapts to throughput of its stream pipe; and adjusting usage of shared network resources of the identified subset of stream pipes in response to the detecting.

According to another set of embodiments, another system is provided for network traffic shaping. The system includes: means for detecting a congestion condition on at least one of a number of stream pipes that each operates to carry network traffic of an associated traffic type from a content source to one or more subscriber terminals via a communications network; means for identifying a subset of the stream pipes as carrying adaptive traffic that is encoded in such a way that automatically adapts to throughput of its stream pipe; and means for traffic shaping to adjust usage of shared network resources of the identified subset of stream pipes in response to the detecting.

BRIEF DESCRIPTION OF THE DRAWINGS

The present disclosure is described in conjunction with the appended figures.

Figure 1:
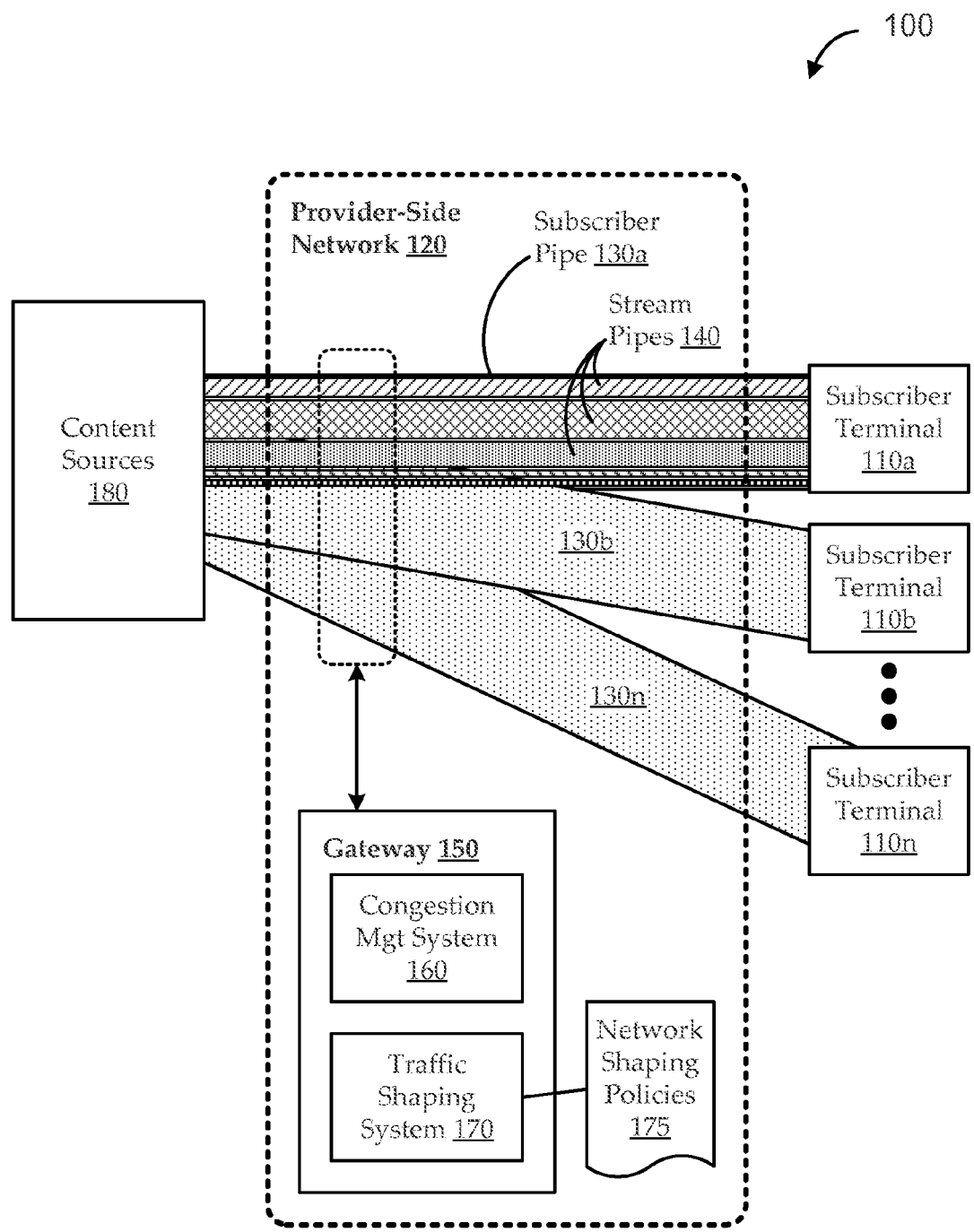
FIG. 1 shows a block diagram of an illustrative communications system having a provider-side network through which content can be delivered from content sources to subscriber terminals, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

Communications resources are increasingly in demand, for example, due to ever-increasing consumption of media over the Internet. Communications services providers (e.g., Internet Service Providers, or ISPs) often seek to satisfy their subscribers' increasing demands for media within the confines of limited network resources. Meeting such demands can be difficult, particularly as levels of congestion on the network change, which can manifest as changing amounts of available network resources (e.g., availability of bandwidth resources on a per-subscriber basis).

Various approaches for congestion management are possible. One category of approach is per-subscriber congestion management. For example, each subscriber can have a contractual resource usage cap (e.g., according to a monthly subscription). If a particular subscriber approaches or exceeds the usage cap, that subscriber's usage can be throttled or blocked (e.g., by lowering the bit rate to that subscriber, preventing the subscriber from accessing certain applications, etc.). Another category of approach is per-application traffic shaping or throttling. For example, applications can be categorized into classes and sent over particular streams (e.g., peer to peer (P2P) traffic is sent over one stream, voice over internet protocol (VoIP) traffic is sent over another, web browsing traffic over another, etc.). If the network becomes congested, the transmission services provider can limit the amount of certain types of traffic that are allowed (e.g., the network can slow or prevent P2P traffic). Such approaches can tend to be limited in a number of ways. For example, the above approaches are typically incapable of managing network congestion at both the application and the subscriber levels. Further, such approaches tend to impact subscribers' experiences on the network in undesirable ways (e.g., by noticeably slowing down and/or limiting access to content).

Some embodiments described herein seek to manage congestion at the application-aware and/or subscriber-aware level with minimal impact to subscriber experience. Such approaches can include managing congestion within the network by preferentially adjusting capacity allocated to streams carrying traffic identified as being adaptive. As used herein, "adaptive traffic" is intended to broadly include any type of traffic that adapts its content quality according to the capacity of the channel through which it is being communicated (e.g., adaptive bit rate video or audio, as compared to certain web browsing traffic that simply slows down, buffers more, etc.). Changing capacity allocations on those streams can cause automatic quality adaptations in such traffic, which can affect overall network load without affecting other (non-adaptive, or otherwise non-identified) types of traffic at all or to the same extent. For example, adaptive video streams can continue uninterrupted (albeit at somewhat reduced quality), while interactive web browsing is substantially unimpeded.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention.

Turning to FIG. 1, a block diagram is shown of an illustrative communications system 100 having a provider-side network 120 through which content can be delivered from content sources 180 to subscriber terminals 110, according to various embodiments. The provider-side network 120 can be any suitable type of communications network with any suitable number and type of communications links and nodes. In one implementation, the provider-side network 120 is a satellite network having one or more satellites, gateways, etc. for communicating with subscriber terminals 110. In other implementations, the provider-side network 120 is or includes a cable network, a cellular network, and/or other wired or wireless networks. The content sources 180 can include any suitable components, such as content servers, content distribution networks, content storage devices, etc. Though shown as separate from the provider-side network 120, the content sources 180 can be implemented as part of the provider-side network 120 and/or in communication with the provider-side network 120 (e.g., over the same or a separate communications network, such as the Internet or a back-haul network). The subscriber terminals 110 can include and/or be in communication with any suitable components for handling content communications (e.g., antennas, modems, set-top boxes, etc.), content display (e.g., televisions, smart phones, desktop computers, laptop computers, tablet computers, etc.), etc.

As described herein, content communications can be considered as occurring through "pipes". Each pipe can be a logical communications path that can include one or more communications links between one or more communications nodes. For example, a "subscriber pipe" 130 can carry traffic to one or more subscribers as multicast communications, unicast communications, point-to-multipoint communications, or in any other suitable manner. In one implementation, subscriber pipes 130 are implemented via carriers on spot beams of a satellite communications network. For example, a subscriber pipe can be implemented as time-division multiplexed (TDM) or time-division multiple access (TDMA) slot assignments according to any suitable combination of frequency (e.g., carrier), time slot, and/or code assignments, which can change dynamically over time. In another implementation, subscriber pipes 130 are implemented via a cable network (e.g., point-to-point or point-to-multipoint). For the sake of simplicity, the subscriber pipes 130 are illustrated as running between the content sources 180 to the subscriber terminals 110 via the provider-side network 120. In such implementations, components of the provider-side network 120 can perform routing functions, protocol functions, proxy functions (e.g., acting as a transparent proxy server with the subscriber terminals acting as proxy clients), etc.

Each subscriber pipe 130 is illustrated as carrying one or more stream pipes 140. For example, each stream pipe carries traffic of a respective stream type, which can be associated with a particular application (e.g., a voice-over-Internet protocol (VoIP) phone application, a massively multiplayer online game (MMOG) application, a video viewer application, etc.), a particular category of traffic (e.g., VoIP traffic, MMOG traffic, streaming movie traffic, etc.), etc. Some implementations manifest a one-to-one association between stream types and stream pipes 140 (i.e., there is one stream pipe 140 for each stream type), while other implementations manifest other associations (e.g., some stream pipes 140 can carry traffic of multiple stream types, traffic of some stream types can be carried by multiple stream pipes 140, etc.). While the stream pipes 140 are illustrated as sub-pipes of the subscriber pipes 130, other implementations are possible. In some implementations, some or all of the stream pipes 140 can be handled in certain ways between the content sources 180 and the provider-side network 120 and in other ways between the provider-side network 120 and the subscriber terminals 110. For example, embodiments of the provider-side network 120 can receive traffic associated with many different stream types from many different content sources 180 and can associate the received traffic with appropriate stream pipes 140 and/or subscriber pipes 130 (e.g., the stream pipes 140 and/or subscriber pipes 130 logically extend between the provider-side network 120 and the subscriber terminals 110, but not between the provider-side network 120 and the content sources 180). Further, while the stream pipes 140 and subscriber pipes 130 are shown as discrete pipes for clarity, the pipes can be implemented in various manners to provide logical functionality. For example, in the event that certain traffic is multicast or broadcast, the same stream pipe 140 can be logically split or spread among multiple subscriber pipes 130, treated as logically separate from any particular subscriber pipes 130, etc.

Each pipe can be associated with various characteristics based on network constraints (e.g., allocated bandwidth, presently available bandwidth, etc.), contractual constraints (e.g., subscription-based minimums or maximums for capacity, quality of service, data usage, permitted traffic types, etc.), policy constraints (e.g., network-wide usage restrictions, minimum assured capacity, etc.), and/or any other suitable characteristics. The characteristics can be tailored for types of pipes. In one implementation, subscriber pipes 130 are associated with subscriber-specific characteristics, such as contractual constraints; while stream pipes 140 are associated with stream-type-specific characteristics, such as traffic type, minimum quality of service, specific traffic handling rules, etc. As described below, the various characteristics can influence and/or be influenced by congestion management rules.

Embodiments of the provider-side network 120 can include a gateway 150. The gateway 150 functionality can be performed by any suitable network components in any suitable network location (e.g., centralized, distributed, implemented as cloud services, etc.). For example, gateway 150 functionality can be implemented in a satellite gateway disposed in a core node of a satellite or cellular communications network, in a head-end system of a cable communications network, etc. As illustrated, the gateway 150 can include a congestion management system 160 and a traffic shaping system 170.

Embodiments of the congestion management system 160 operate to detect a congestion condition on the provider-side network 120. For example, embodiments of the congestion management system 160 can be considered as detecting a congestion condition on at least one of the stream pipes 140 in any suitable manner, including directly or indirectly. For example, the congestion management system 160 can detect a reduction in throughput or any other indication of congestion at a network level, a sub-network level (e.g., a region, spot beam, group of pipes, routing node, etc.), a subscriber pipe 130 level, a stream pipe 140 level, etc. Other embodiments can be considered as detecting a congestion condition on one or more "channels" of the provider-side network 120. For example, a "channel" can generally refer to a collection of stream pipes 140 (e.g., as part of subscriber pipes 130) falling within a logical portion of the network, such as a spot beam and/or carrier, a defined regional subset of a network, etc. In some implementations, channels are dynamically allocated capacity (e.g., bandwidth, etc.), and each stream pipe of a channel can be allocated a portion of that dynamic capacity.

The congestion management system 160 can also identify a subset (e.g., one or more, if any) of stream pipes 140 as carrying adaptive traffic. As used herein, "adaptive" traffic generally includes any type of traffic that is encoded in such a way that automatically adapts to throughput of its stream pipe 140. Some examples of adaptive traffic include adaptive bit-rate encoded traffic, MPEG-DASH (Moving Picture Experts Group-Dynamic Adaptive Streaming over hypertext transfer protocol (HTTP)) traffic, Adaptive HTTP streaming (AHS) traffic, HTTP Adaptive Streaming (HAS) traffic, Adobe Systems HTTP Dynamic Streaming traffic, Apple Inc. HTTP Live Streaming (HLS) traffic, Microsoft Smooth Streaming traffic, Advanced Video Coding (AVC) traffic, adaptive-resolution video traffic, and adaptive-resolution audio traffic. In some implementations, traffic is tagged (e.g., as adaptive traffic, by type, by application, or in any other suitable manner) by its originating content source 180, as part of its metadata, etc. For example, a particular type of traffic known to be adaptive and/or traffic from content sources 180 known to be adaptive can be assigned (e.g., a priori by the gateway 150) to one or more particular stream pipes 140, thereby effectively pre-identifying those stream pipes 140 as carrying adaptive traffic. In other implementations, deep packet inspection (DPI) and/or other suitable techniques can be used to identify content sources or content types likely to be adaptive. For example, identifying a subset of stream pipes 140 as carrying adaptive traffic can include identifying that some or all (e.g., all, some minimum threshold amount, etc.) of the traffic in a particular stream pipe 140 is of an adaptive type, that the originating content source 180 for some or all of the traffic is determined (predetermined or otherwise) to be likely to distribute adaptive traffic (e.g., the source domain points to a known media aggregator website, the originating content source 180 is a known media broadcaster, etc.), that a content request in response to which the traffic is being communicated indicates a likelihood that the traffic is adaptive, etc.

Embodiments of the traffic shaping system 170 operate to reduce usage of shared network resources of the identified subset of stream pipes in response to detection of the congestion condition by the congestion management system 160. For example, the congestion management system 160 can effectively determine which stream pipes 140 includes (or is likely to include) application traffic that can automatically adapt to squeezing (e.g., reducing the bit rate for that pipe), and the traffic shaping system 170 can help alleviate the congestion condition by selectively squeezing those stream pipes 140 determined to be adaptable to the squeezing.

For example, some streaming media services (e.g., Netflix, Hulu, YouTube, and others) have begun to use adaptive bit rate encoding (and/or other adaptive schemes) to provide different audio/video quality to users having different service levels (e.g., some users have broadband Internet connections that can support HD-quality video streams, while others have Internet connections that can only support lower quality streams). One illustrative streaming media service offers video streaming at "HD" quality (e.g., 5.184 Mbps), "Best" quality (e.g., 2.392 Mbps), "Better" quality (e.g., 1.492 Mbps), or "Good" quality (e.g., 689 kpbs). According to such a scheme, a move from HD quality to Good quality reduces the offered load during congestion by almost 87% (i.e., 689 kpbs/5.184 Mbps), while allowing the subscriber to continue watching the same video. Some recent reports indicate that traffic from the top two services providing adaptive types of traffic, alone, accounts for between a third and a half of all Internet traffic in the United States. Accordingly, identifying and selectively squeezing those stream pipes 140 carrying adaptive traffic can appreciably reduce congestion across the network in a manner that can have little effect on other uses of the network resources.

Various embodiments are described herein in context of "squeezing" pipes (i.e., reducing the capacity of pipes) in response to detecting congestion in one or more pipes of a communications network. However, the same or similar techniques can be used in context of relaxing pipes (i.e., increasing the capacity of pipes) in response to detecting available excess capacity on the communications network. For example, implementations can detect that the network (e.g., channels, pipes, etc.) is becoming or has recently become either more congested or less congested to some significant degree (e.g., by some predetermined amount, in excess of a threshold, for more than some amount of time, etc.). In response, such implementations can selectively adjust the capacity of pipes carrying adaptive traffic by reducing or increasing their capacity, as appropriate. Accordingly, implementations described as "squeezing," "limiting," or the like can generally operate to adjust capacity of pipes carrying adaptive traffic in response to detected changes in congestion (i.e., either increased or decreased congestion).

According to some embodiments, the traffic shaping system 170 operates in accordance with one or more network shaping policies 175. The network shaping policies 175 can define policies for how pipe capacities should be adjusted in response to congestion conditions, for example, by defining which types of stream pipes 140 to squeeze in which ways in response to which types of congestion conditions. The network shaping policies 175 can also be defined at any suitable level, for example, at a network level (e.g., for all stream pipes 140 carrying a certain type of traffic across the entire network, for network-wide congestion levels, etc.) or at a subscriber level (e.g., each subscriber is treated according to a subscription level, a service-level agreement (SLA), device capabilities, usage trends, etc.). In some implementations, network shaping policies 175 can be defined at a subscriber cluster level. For example, a "subscriber cluster" can refer to any logical grouping of one or more subscribers or subscriber terminals 110, for example, by premises (e.g., individuals in a given house, apartment, dormitory, etc.), by geography (e.g., a neighborhood, a city, a spot beam, etc.), by network resource grouping (e.g., a multicast group, a carrier, a modcode, etc.), or by any other suitable shared characteristic (e.g., shared demographics, shared preferences, shared equipment capabilities, etc.). In one embodiment, each stream pipe 140 is a sub-pipe of a subscriber pipe 130 that is associated with a subscriber terminal 110, each subscriber terminal 110 is associated with a subscriber-level network shaping policy 175, and the traffic shaping system 170 operates to reduce (or increase) usage of shared network resources (e.g., of the identified subset of stream pipes 140) in accordance with the subscriber-level network shaping policies 175.

Embodiments of the traffic shaping system 170 can adjust the capacity of (e.g., squeeze) stream pipes 140 in various ways. For example, reducing usage of shared network resources of the identified subset of stream pipes 140 can include reducing capacity allocated to the identified subset of stream pipes by reducing bandwidth, throughput, bit rate, etc. According to various embodiments, allocated capacity can be controlled by an assigned bit rate, symbol rate, number of time slots, number of carriers, or similar parameters. The allocated capacity may, therefore, be changed by varying such parameters (e.g., reducing number of time slots to reduce allocated capacity). Some implementations reduce usage of shared network resources of the identified subset of stream pipes without substantially reducing capacity allocated to other sub-pipes of their respective subscriber pipes. Suppose, for example, that a first stream pipe 140 is carrying adaptive streaming video content, and a second stream pipe 140 is carrying web browsing traffic. Such implementations can selectively squeeze the first pipe, while leaving the second pipe alone. Other implementations can reduce usage of shared network resources of the identified subset of stream pipes 140 preferentially over reducing capacity allocated to any other stream pipes of respective subscriber pipes 130. For example, both the identified subset of stream pipes 140 and some or all of the other stream pipes 140 (e.g., those not carrying adaptive traffic) can be squeezed, but the identified subset of stream pipes 140 can be squeezed prior to squeezing any other stream pipes 140, or the identified subset of stream pipes 140 can be squeezed to a greater extent or more quickly (e.g., at a faster rate) than any other stream pipes 140. Similar techniques to those described above can be used in certain embodiments to increase usage of shared network resources of the identified subset of stream pipes 140, as appropriate, in response to detecting excess capacity.

As discussed above, some squeezing or relaxing of pipe capacity can be performed at the subscriber or subscriber cluster level. For example, each stream pipe 140 can be a sub-pipe of a respective one of a number of subscriber pipes 130, each associated with a subscriber terminal 110, and each subscriber terminal 110 can be associated with a subscriber-level network shaping policy 175. The traffic shaping system 170 can reduce usage of shared network resources of the identified subset of stream pipes 140 in accordance with the subscriber-level network shaping policies 175 associated with the respective subscriber pipes 130. In some embodiments, the congestion management system 160 can identify a subset of the subscriber pipes 130 as presently exceeding respective allocated throughputs, such that each of the identified subset of stream pipes 140 is a sub-pipe of a respective one of the identified subset of subscriber pipes 130. For the sake of illustration, suppose each of a group of subscribers is allocated 20 MB of bandwidth (e.g., statically, or presently as a dynamic allocation). Most of the subscribers are operating well within their respective allocations, while others are exceeding their allocations (e.g., presently exceeding the allocation, issuing requests that seek to exceed the allocation, trending toward exceeding the allocation, etc.). Some implementations can identify the subscriber pipes 130 associated with those subscribers that are exceeding their allocations and can preferentially squeeze the stream pipes 140 carrying adaptive traffic to those subscribers exceeding their allocations (e.g., squeeze only those subscribers' pipes, squeeze those subscribers' pipes to a greater extent and/or at a higher rate, squeeze those subscribers' pipes before squeezing any others, etc.).

Various embodiments can squeeze or relax stream pipes 140 globally, by subscriber, or in any other suitable manner. For example, according to some implementations, the effective throughput of each stream pipe 140 is one of a plurality of predefined throughput levels defined by the network shaping policy 175. In such implementations, the traffic shaping system 170 can reduce usage of shared network resources of the identified subset of stream pipes 140 by adjusting their effective throughput from a present throughput level to a respective lower throughput level (e.g., from a level corresponding to "Best" to a level corresponding to "Good"). This adjustment can involve moving all the identified stream pipes 140 to the same target throughput level (e.g., all the identified stream pipes 140 are moved to the same throughput level, regardless of whether they were previously at, above, or below that level), shifting all the identified stream pipes 140 down by a specified number of levels (e.g., all the identified stream pipes 140 are shifted to a next-lower level, for example, from "Best" to "Better," from "Better" to "Good," etc.), shifting all identified stream pipes 140 above a certain level down by a specified number of levels (e.g., any identified stream pipes 140 presently at "Best" are shifted to "Better," but any identified stream pipes 140 at "Better" or below are left alone), or any other suitable type of adjustment. While "Best," "Better," and "Good" are used, those designations are intended only for the sake of clarity; and suitable number and/or type of throughput level designations are possible.

For the sake of illustration, suppose a first subscriber is streaming a movie at "HD" quality, and a second subscriber is streaming a movie only at "Good" quality. In response to a detected level of network congestion, the network shaping policies 175 dictate that a maximum QoS for stream pipes 140 identified as carrying streaming movie traffic should correspond to the "Good" quality level. Accordingly, implementations can squeeze all associated pipes to a rate that forces a maximum of "Good" quality distribution. Such an approach can provide a number of features. One such feature is that all subscribers can continue to watch their respective traffic at "Good" quality. For example, an alternative approach that reduces the bit rate for all streaming video traffic in aggregate by some amount (e.g., 50%) would likely cause the first subscriber to receive his movie at reduced quality, while causing the second subscriber's stream to drop altogether (having too low a bit rate to support the streaming video connection). Another such feature is that the subscribers can continue to use the network in other ways without appreciable impact. For example, an alternative approach that reduces the bit rate for all traffic in aggregate by some amount, or one that throttles some or all subscribers' usage, would likely cause an appreciable impact (e.g., slowing) to normal web browsing and/or other uses of the network.

While some embodiments are described with reference to particular quality levels (e.g., "HD" or "Good") or thresholds, such levels and thresholds are intended only as non-limiting examples. Various embodiments can operate as a feedback system that detects a level of congestion (e.g., presently, or by analyzing statistical changes in congestion), adjusts the capacity of one or more pipes accordingly (e.g., by squeezing or expanding), and can continually iterate the detecting and adjusting to manage congestion of the network over time. For example, if congestion is detected, identified stream pipes 140 can be squeezed by a defined amount (e.g., by some predetermined increment, according to a policy, etc.), and the level of congestion can be detected again to see if remediation has occurred. If not, the identified stream pipes 140 can be squeezed again by a defined amount, and the level of congestion can be detected again, and so on, until remediation has occurred. Subsequently, if excess capacity is detected, some implementations can expand the same or different identified stream pipes 140 by a defined amount (e.g., by the same or a different predetermined increment, according to a policy, etc.), and the level of congestion can be detected again, and so on until a desired amount (e.g., some or all) of the excess capacity has been used. Various embodiments of the feedback can be implemented in different ways, including with different amounts of asymmetry (e.g., the squeezing and expanding can be performed according to different amounts, different policies, etc.), with different amounts of hysteresis (e.g., one implementation can squeeze pipes substantially when congestion is detected, but can wait for a preset delay before expanding pipes when excess capacity is detected, etc.), etc.

According to some embodiments, when identifying adaptive traffic, the congestion management system 160 can be less concerned with the type of traffic itself, and more concerned with identifying services that automatically adapt their content delivery according to the pipe size (e.g., detected throughput, bit rate, etc.). For example, rather than directly changing the "quality" of media being communicated via a particular stream pipe 140, embodiments of the traffic shaping system 170 squeeze the pipe itself (e.g., by allocating the pipe less bandwidth, a maximum quality of service (QoS), or otherwise effectively reducing the throughput or bit rate of the pipe). This can cause the upstream content source 180 for the media to detect the change and respond by automatically lowering the quality (e.g., bit rate) of the communicated media. Similarly, expanding the particular stream pipe 140 by the traffic shaping system 170 can cause the upstream content source 180 for the media to detect the change and respond by automatically increasing the quality of the communicated media. Referring to the illustrative service described above, the congestion management system 160 can detect a congestion condition and identify that a particular set of stream pipes 140 are carrying traffic from that service. All those identified stream pipes can be squeezed to allow a maximum bit rate of one Megabit-per-second. This can cause the service to automatically adapt all its traffic over those pipes to a maximum of "Good" quality without the provider-side network 120 directly interfering with the content itself Indeed, in many such contexts, the content service may be a subscription service, and the provider-side network 120 may not have access to the content itself.

Figure 2:
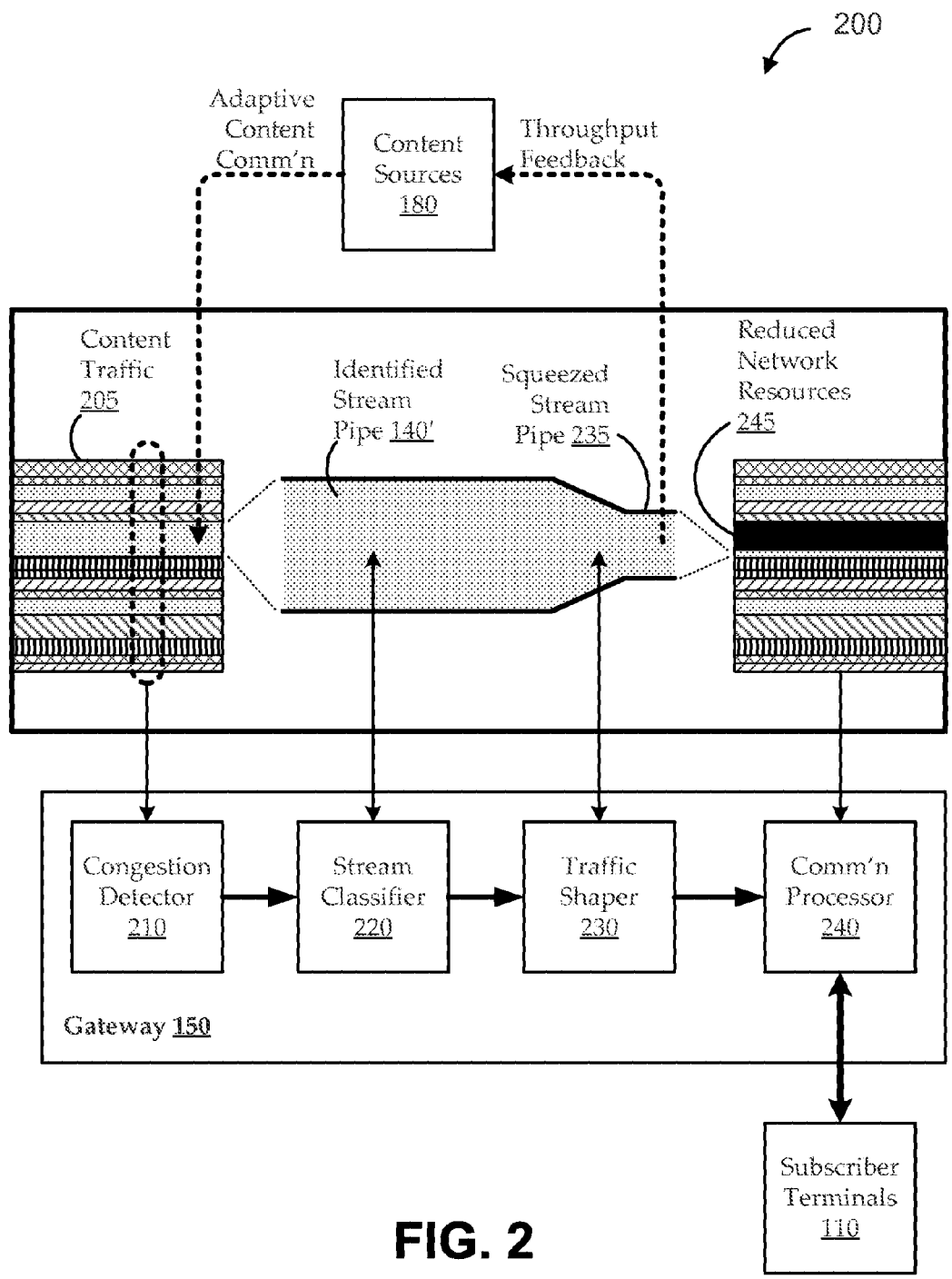
FIG. 2 shows an illustrative partial communications environment, in which a gateway implements pipe squeezing, according to various embodiments.

FIG. 2 shows an illustrative partial communications environment 200, in which a gateway 150 implements pipe squeezing, according to various embodiments. While the description focuses on "pipe squeezing," some embodiments of the gateway 150 can similarly expand identified pipes, as appropriate, when excess capacity is detected. As illustrated, one or more content sources 180 provide adaptive content communications, which can be part of the aggregate content traffic 205 of a communications network. The content traffic 205 is illustrated in aggregate, but can alternatively be considered per subscriber pipe 130 or in any other suitable manner. A gateway 150 can be disposed in a node (e.g., of a provider-side network) between the content sources 180 and subscriber terminals 110 associated with end consumers of the content.

Embodiments of the gateway 150 can include a communications processor 240, which can facilitate communications between the gateway 150, the subscriber terminals 110, and/or the content sources 180. Embodiments of the gateway 150 can also include means for detecting a congestion condition (e.g., detecting a lack of capacity or an excess of capacity) on at least one stream pipe 140 (e.g., in the aggregate, per subscriber, etc.), means for identifying one or more of the stream pipes 140 as carrying adaptive traffic that is encoded in such a way that automatically adapts to throughput of its stream pipe, and means for traffic shaping to reduce (or increase) usage of shared network resources of the identified subset of stream pipes in response to the detecting.

The various means of the gateway 150 can be implemented in hardware and/or software, each in a single device, or with functions spread among multiple devices, components, systems, etc. Some implementations can include one or more Application Specific Integrated Circuits (ASICs) adapted to perform a subset of the applicable functions in hardware. Other implementations can have functions performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed Each can also be implemented, in whole or in part, with instructions embodied in a computer-readable medium, formatted to be executed by one or more general or application specific controllers.

The means for detecting the congestion condition can include a congestion detector 210, which can be implemented as one or more components of the congestion management system 160 described with reference to FIG. 1. The means for identifying one or more of the stream pipes 140 as carrying adaptive traffic can include a stream classifier 220, which can also be implemented as one or more components of the congestion management system 160 described with reference to FIG. 1. The means for traffic shaping can include a traffic shaper 230, which can be implemented as the traffic shaping system 170 described with reference to FIG. 1. For example, the congestion detector 210 can detect a congestion condition in the content traffic 205. The stream classifier 220 identifies a pipe illustrated (and magnified, for the sake of clarity) as identified stream pipe 140'. In response to detecting the congestion condition, the traffic shaper 230 can squeeze the identified stream pipe 140', resulting in the illustrated squeezed stream pipe 235. This can cause feedback to the content source 180 for that identified stream pipe 140' indicating the reduction in throughput of the pipe and a resulting adaptation in the traffic communicated by that content source 180. This can manifest as a reduction in network resource usage (the reduction is illustrated as reduced network resources 245). The communications processor 240 can communicate the squeezed traffic to appropriate subscriber terminals 110. As described above, some implementations of the traffic shaper 230 can also expand the identified stream pipe 140', which can cause feedback to the content source 180 for that identified stream pipe 140' indicating the increase in throughput of the pipe and a resulting adaptation in the traffic communicated by that content source 180. This can manifest as an increase in network resource usage.

Figure 3A:
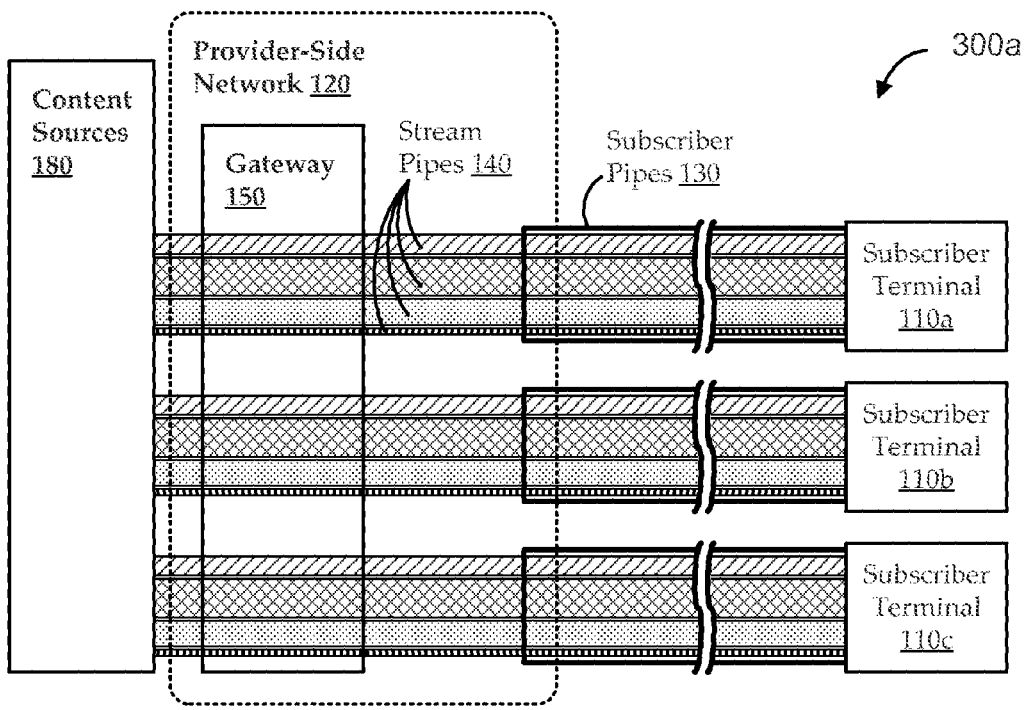
FIGS. 3A and 3B show embodiments in which pipe squeezing is performed at both the application level and the individual subscriber level, before and after the pipe squeezing is performed, respectively.
Figure 3B:
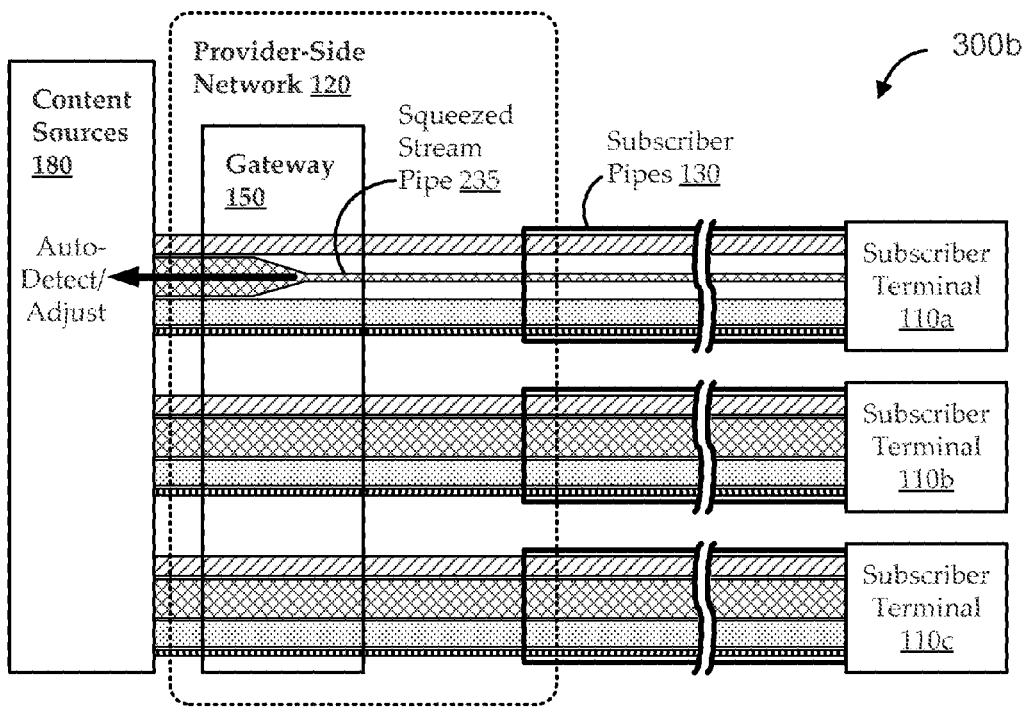

For the sake of added clarity, FIGS. 3A and 3B show embodiments of a simplified communications environment 300 in which pipe squeezing is performed at both the application level and the individual subscriber level, before and after the pipe squeezing is performed, respectively. Content sources 180 are in communication with subscriber terminals 110 via a provider-side network 120 having a gateway 150. Content is communicated via subscriber pipes 130, each having stream pipes 140 (e.g., as sub-pipes). The gateway 150 can detect a congestion condition, identify a stream pipe 140 carrying adaptive content traffic, and squeeze the identified stream pipe 140 in response (e.g., as described with reference to FIG. 1). As illustrated in FIG. 3B, the resulting squeezed stream pipe 235 (e.g., as described with reference to FIG. 2) can cause a reduction in throughput of the pipe to be detected by an affected one or more content sources 180, and the content source(s) 180 can automatically adapt their communications, accordingly. As described above, this can result in a reduction in network resource usage.

Figure 4A:
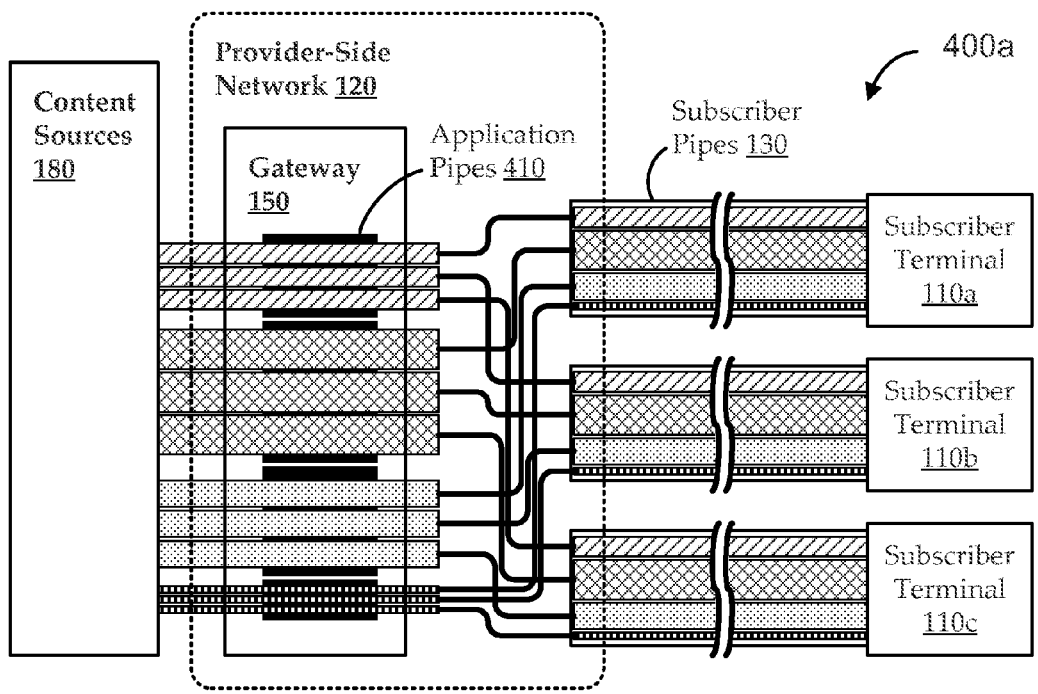
FIGS. 4A and 4B show embodiments in which pipe squeezing is performed at the application level and the aggregate subscriber level, before and after the pipe squeezing is performed, respectively.
Figure 4B:
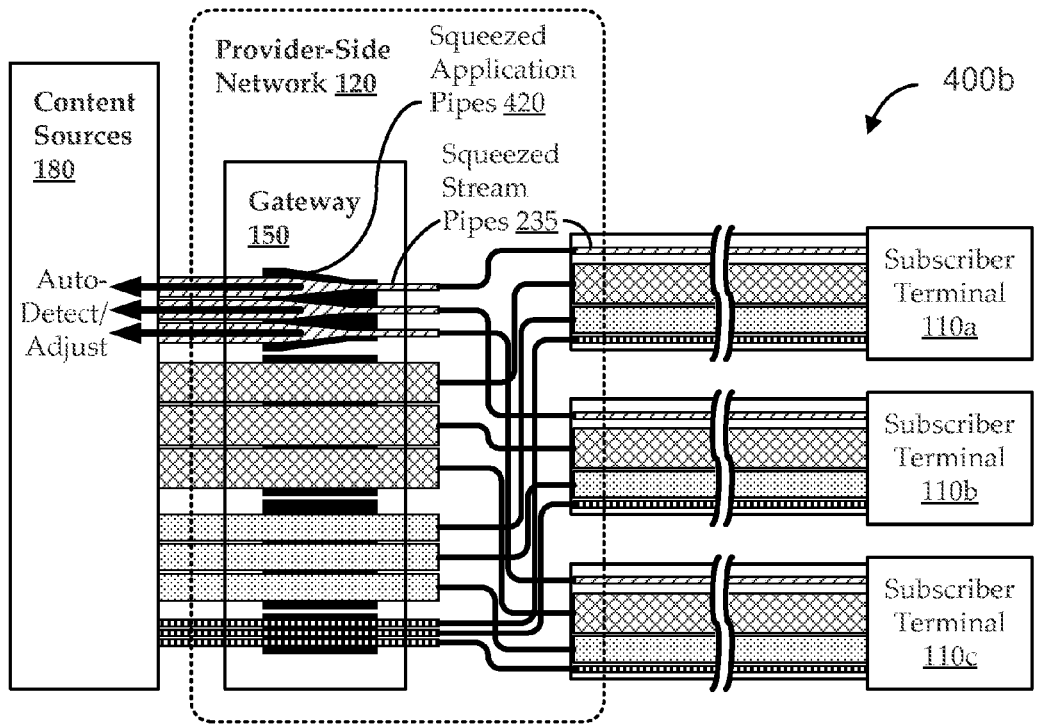

FIGS. 4A and 4B show embodiments of a simplified communications environment 400 in which pipe squeezing is performed at the application level and the aggregate subscriber level, before and after the pipe squeezing is performed, respectively. As illustrated, the gateway 150 can treat traffic from the various content sources 180 at the application level, such that there can effectively be application pipes 410 carrying all the traffic of a particular type, from a particular content source 180, and/or from a particular content service. For example, the content sources 180 may not be aware of the subscriber pipes 130, so that the subscriber pipes 130 effectively run from the provider-side network 120 to the subscriber terminals 110. The gateway 150 can detect a congestion condition, identify a set of stream pipes 140 (e.g., corresponding to, or as sub-pipes of, an application pipe 410) as carrying adaptive content traffic, and squeeze the identified application pipe 410 in response. As illustrated in FIG. 4B, the resulting squeezed application pipe 420 (e.g., which can effectively be a set of squeezed stream pipes 235) as described with reference to FIG. 2) can cause a reduction in throughput of the pipes to be detected by an affected one or more content sources 180, and the content source(s) 180 can automatically adapt their communications, accordingly. As described above, this can result in a reduction in network resource usage. While the reduction in network usage in FIG. 3B can manifest at the particular subscriber level, the reduction in network usage in FIG. 4B can manifest across subscribers in aggregate.

The illustrated variations of FIGS. 3A-4B are not intended to be comprehensive, as many other approaches can be implemented using the techniques described herein. For example, pipe squeezing can account for subscriber clusters, application classes or groups, and/or other characteristics or factors. Further, as described above, embodiments can associate different network shaping policies 175 with different subscribers, clusters, application types, etc. For example, different classifications of subscribers and/or applications can be associated with different priority levels, disaster rules (e.g., for when congestion exceeds a threshold), and/or other suitable metrics according to network shaping policies 175. Even further, as described above, pipes can be expanded (e.g., "un-squeezed"), as appropriate, when excess capacity is available, such as when a congestion condition is no longer detected.

Figure 5:
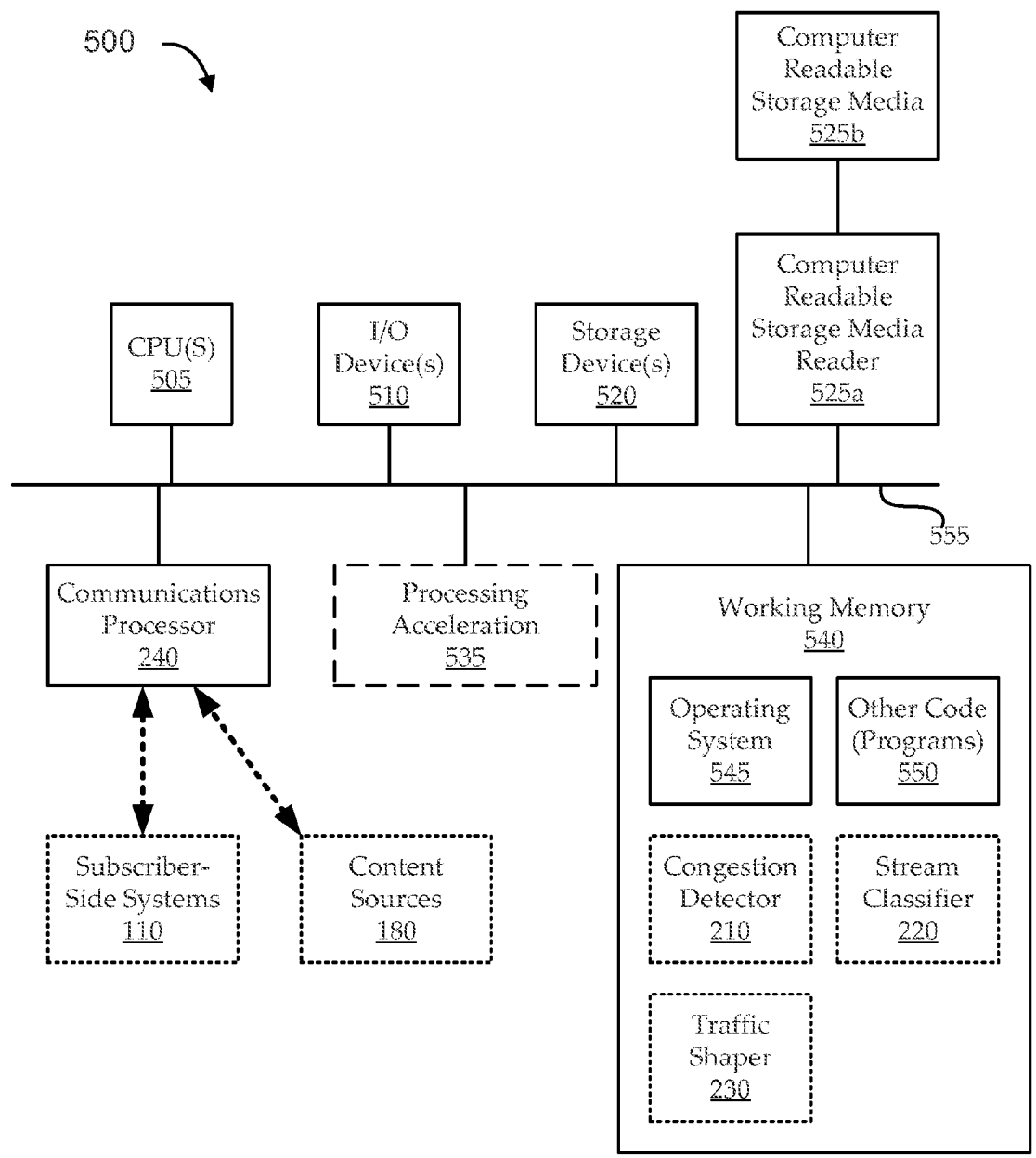
FIG. 5 shows an illustrative computational system for implementing certain provider-side functionality, according to various embodiments.

FIG. 5 shows an illustrative computational system 500 for implementing certain provider-side functionality, according to various embodiments. For example, the computational system 500 can include or perform functionality of the gateway 150, as described above with reference to FIGS. 1-4B. For the sake of simplicity, the computational system 500 is shown including hardware elements that can be electrically coupled via a bus 555. However, embodiments of the computational system 500 can be implemented as or embodied in single or distributed computer systems, in one or more locations, or in any other useful way. For example, while illustrated as a single computational system 500, functionality can be implemented across multiple computational systems (e.g., in a distributed system, in the "cloud," etc.) that can be in direct or indirect communication with each other.

The hardware elements can include one or more central processing units (CPUs) 505, one or more input and/or output (I/O) devices 510 (e.g., a mouse, a keyboard, a display device, a printer, etc.). The computational system 500 can also include one or more storage devices 520. By way of example, storage device(s) 520 can be disk drives, optical storage devices, solid-state storage device such as a random access memory (RAM) and/or a read-only memory (ROM), which can be programmable, flash-updateable and/or the like. The computational system 500 can additionally include a computer-readable storage media reader 525a, which can further be connected to a computer-readable storage medium 525b, together (and, optionally, in combination with storage device(s) 520) comprehensively representing remote, local, fixed, and/or removable storage devices plus storage media for temporarily and/or more permanently containing computer-readable information.

Embodiments can include a communications processor 240 (e.g., a modem, a network card (wireless or wired), an infra-red communication device, etc.), and working memory 540, which can include RAM, ROM, and/or other devices.

In some embodiments, the computational system 500 can also include a processing acceleration unit 535, which can include a DSP, a special-purpose processor and/or the like. The communications processor 240 can permit data to be exchanged with a network and/or any other computer described above with respect to the computational system 500. For example, content traffic and/or other information can be communicated via the communications processor 240 to content sources 180, subscriber-side systems 110, etc. (e.g., over a provider-side network 120, not shown).

The computational system 500 can also include software elements, shown as being currently located within a working memory 540, including an operating system 545 and/or other code 550, such as an application program (which can be a client application, web browser, mid-tier application, relational database management system (RDBMS), etc.). The software elements and/or functionality thereof can alternatively be implemented in hardware, firmware, processors, controllers, or any other suitable manner. In some embodiments, one or more functions of the gateway 150 can be implemented as application code 550 in working memory 540. For example, the application code 550 can include instructions which, when executed, can cause one or more CPUs 505 to perform functions of the congestion detector 210, the stream classifier 220, and/or the traffic shaper 230.

Figure 6:
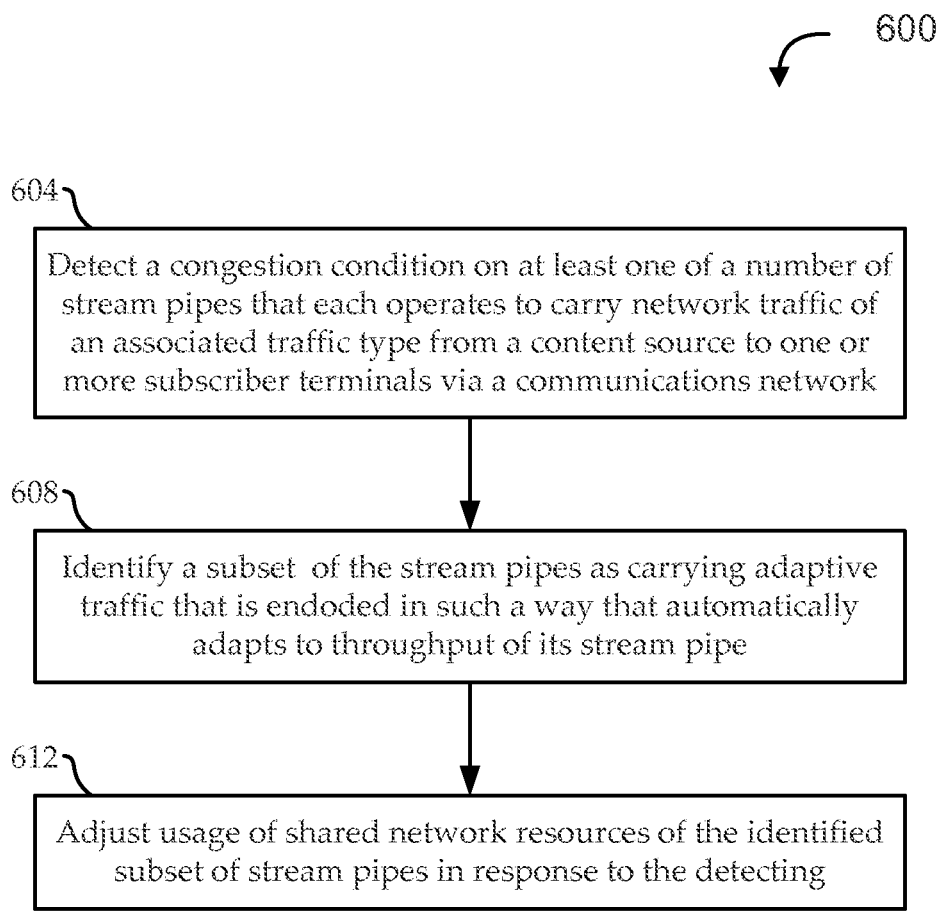
FIG. 6 shows a flow diagram of an illustrative method for network traffic shaping, according to various embodiments.

Various system embodiments, including those described above with reference to FIGS. 1-5 can be used to perform functions, including those described below in FIGS. 6. FIG. 6 shows a flow diagram of an illustrative method 600 for network traffic shaping, according to various embodiments. Embodiments of the method 600 can begin at stage 604 by detecting a congestion condition on at least one of a number of stream pipes that each operates to carry network traffic of an associated traffic type from a content source to one or more subscriber terminals via a communications network. As described above, the detection can involve directly detecting the congestion on a particular one or more stream pipes, detecting the congestion in aggregate on the network, or in any other suitable manner. Further, as described above, the detection can involve detecting congestion or a lack of congestion, as appropriate.

At stage 608, embodiments can identify a subset of the stream pipes as carrying adaptive traffic that is encoded in such a way that automatically adapts to throughput of its stream pipe. The identifying can be performed in various ways, as described above. In some implementations, the identifying involves inspecting traffic traversing the stream pipes (e.g., using deep packet inspection or some other technique) to determine whether the traversing traffic includes adaptive traffic. In other implementations, certain stream pipes are designated a priori for carrying adaptive traffic, and the identifying is based on those designations. In still other implementations, the identifying is based on determining a source domain of the content, an application type associated with the content, a communications service or provider associated with the content, etc.

At stage 612, embodiments adjust (e.g., reduce or expand) usage of shared network resources of the identified subset of stream pipes in response to the detecting. For example, the adjusting can involve reducing capacity allocated to the identified subset of stream pipes. In some implementations, the adjusting is according to one or more network shaping policies (e.g., at a subscriber level, a subscriber cluster level, a network level, etc.). For example, each stream pipe is a sub-pipe of a respective subscriber pipe, each subscriber pipe is associated with a subscriber terminal and with a subscriber-level network shaping policy, and the adjusting can be in accordance with the subscriber-level network shaping policies associated with the respective subscriber pipes. As described above, the adjusting can be according to predefined levels, predefined increments, target levels, etc. For example, in some implementations, the adjusting involves adjusting an effective throughput of each of at least some of the identified stream pipes from its respective present throughput level to a target throughput level. The target throughput level can be one of a number of throughput levels predefined by a network shaping policy, the target throughput level can correspond to a minimum throughput level predefined by a network shaping policy, etc. In other such implementations, the target throughput level is common across the identified stream pipes (e.g., regardless of whether the present throughput level is at, above, or below the target). Many other types of adjusting are possible, for example, as described above.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Some embodiments are described with specific reference to "content objects" and/or "media." As used herein, content objects are not intended to be limited to particular types of media, and can generally describe any data object or sub-object that includes content data relating, for example, to media content (e.g., movies, television episodes, other video, music, etc.), software distribution content, online periodical distribution content (e.g., magazines, etc.), application distribution content (e.g., apps, etc.), etc.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A system for network traffic shaping, the system comprising:
   a plurality of stream pipes that each operates to carry network traffic of an associated traffic type from a content source to one or more subscriber terminals via a communications network, wherein only a subset of the plurality of stream pipes operates to carry adaptive traffic that is encoded in such a way that automatically adapts to throughput of its stream pipe; and
   a gateway, communicatively coupled with the plurality of stream pipes and disposed in the communications network between the content source and the subscriber terminals, the gateway comprising:
   a congestion management system that operates to detect a congestion condition on the communications network; and
   a traffic shaping system that is communicatively coupled with the congestion management system and operates to adjust allocation of shared network resources of at least one of the subset of stream pipes in response to detecting the congestion condition.

2. The system of claim 1, wherein:
   the communications network comprises a plurality of channels, each comprising at least some of the plurality of stream pipes; and
   the congestion management system operates to detect the congestion condition on at least one of the channels of the communications network.

3. The system of claim 1, wherein:
   the communications network comprises a plurality of subscriber pipes, each associated with at least a respective one of the subscriber terminals, and each comprising at least one of the plurality of stream pipes; and
   the congestion management system operates to detect the congestion condition on at least one of the subscriber pipes of the communications network.

4. The system of claim 1, wherein the traffic shaping system operates to adjust allocation of shared network resources of the identified subset of stream pipes without substantially adjusting capacity allocated to other sub-pipes of their respective subscriber pipes.

5. The system of claim 1, wherein the traffic shaping system operates to adjust allocation of shared network resources of the identified subset of stream pipes preferentially over adjusting capacity allocated to any other sub-pipes of their respective subscriber pipes.

6. The system of claim 5, wherein the traffic shaping system operates to adjust allocation of shared network resources of the identified subset of stream pipes prior to adjusting capacity allocated to any other sub-pipes of their respective subscriber pipes.

7. The system of claim 5, wherein the traffic shaping system operates to adjust allocation of shared network resources of the identified subset of stream pipes at a first rate and to adjust allocation of shared network resources of any other sub-pipes of their respective subscriber pipes at a second rate, the first rate being faster than the second rate.

8. The system of claim 1, wherein the traffic shaping system operates to adjust allocation of shared network resources of the identified subset of stream pipes by adjusting capacity allocated to the identified subset of stream pipes.

9. The system of claim 1, wherein:
   the effective throughput of each stream pipe is one of a plurality of predefined throughput levels defined by a network shaping policy; and
   the traffic shaping system operates to adjust allocation of shared network resources of the identified subset of stream pipes by adjusting an effective throughput of each of at least some of the identified stream pipes from its respective present throughput level to a respective other throughput level.

10. The system of claim 9, wherein the traffic shaping system operates to:
    adjust the effective throughput of each identified stream pipe to a next higher or next lower one of the predefined throughput levels.

11. The system of claim 9, wherein the traffic shaping system operates to:
    determine a minimum throughput level according to the network shaping policy; and
    adjust the effective throughput of each identified stream pipe to a lower one of the predefined throughput levels only when its respective present throughput level is higher than the minimum throughput level.

12. The system of claim 9, wherein the traffic shaping system operates to:
    determine a target throughput level according to the network shaping policy; and
    adjust the effective throughput of each identified stream pipe to the target throughput level.

13. The system of claim 1, wherein:
    each stream pipe is a sub-pipe of a respective one of a plurality of subscriber pipes, each associated with a subscriber terminal;
    each subscriber terminal is associated with a subscriber-level network shaping policy; and
    the traffic shaping system operates to adjust allocation of shared network resources of the identified subset of stream pipes in accordance with the subscriber-level network shaping policies associated with the respective subscriber pipes.

14. The system of claim 1, wherein:
    each stream pipe is a sub-pipe of a respective one of a plurality of subscriber pipes that has a respective allocated throughput; and
    the congestion management system further operates to identify a subset of the plurality of subscriber pipes as presently exceeding their respective allocated throughputs, such that each of the identified subset of stream pipes is a sub-pipe of a respective one of the identified subset of subscriber pipes.

15. The system of claim 14, wherein the respective allocated throughput of each subscriber pipe is dynamically allocated.

16. The system of claim 9, wherein the network shaping policy is at least one of a network-level network shaping policy, a subscriber-level network shaping policy, or a subscriber cluster-level network shaping policy.

17. The system of claim 1, wherein the congestion management system operates to identify the subset of stream pipes as carrying adaptive traffic by:
   inspecting traffic traversing the plurality of stream pipes to determine whether the traversing traffic comprises adaptive traffic.

18. The system of claim 1, wherein:
   the plurality of stream pipes comprises adaptive stream pipes that are designated a priori for carrying adaptive traffic; and
   the congestion management system operates to identify the subset of stream pipes by identifying at least some of the adaptive stream pipes.

19. The system of claim 1, wherein the adaptive traffic is selected from the group consisting of:
   adaptive bit-rate encoded traffic; MPEG-DASH (Moving Picture Experts Group-Dynamic Adaptive Streaming over hypertext transfer protocol (HTTP)) traffic; Adaptive HTTP streaming (AHS) traffic; HTTP Adaptive Streaming (HAS) traffic; Adobe Systems HTTP Dynamic Streaming traffic; Apple Inc. HTTP Live Streaming (HLS) traffic; Microsoft Smooth Streaming traffic; Advanced Video Coding (AVC) traffic; adaptive-resolution video traffic; and adaptive-resolution audio traffic.

20. The system of claim 1, wherein the communications network is a satellite communications network.

21. The system of claim 1, wherein the gateway is implemented in a core node of the communications network.

22. A method for network traffic shaping, the method comprising:
   detecting a congestion condition on a communications network that indicates congestion on at least one of a plurality of stream pipes that each operates to carry network traffic of an associated traffic type from a content source to one or more subscriber terminals via the communications network,
   the plurality of stream pipes comprising, at the time of the detecting, a first stream pipe carrying first network traffic of a first traffic type, and a second stream pipe carrying second network traffic of a second traffic type;
   identifying a subset of the plurality of stream pipes as carrying adaptive traffic by identifying that at least the first traffic type is encoded in such a way that automatically adapts to throughput of its stream pipe and that the second traffic type is not encoded in such a way that automatically adapts to throughput of its stream pipe, such that the identified subset of stream pipes includes the first stream pipe and excludes the second stream pipe; and
   adjusting allocation of shared network resources of the identified subset of stream pipes in response to the detecting.

23. The method of claim 22, wherein:
   the congestion condition is detected on at least one of a plurality of channels of the communications network, each channel comprising at least some of the plurality of stream pipes.

24. The method of claim 22, wherein:
   the congestion condition is detected on at least one of a plurality of subscriber pipes of the communications network, each subscriber pipe associated with at least a respective one of the subscriber terminals, and each comprising at least one of the plurality of stream pipes.

25. The method of claim 22, wherein the adjusting comprises adjusting capacity allocated to the identified subset of stream pipes.

26. The method of claim 22, wherein:
   the adjusting comprises adjusting an effective throughput of each of at least some of the identified stream pipes from its respective present throughput level to a target throughput level of a plurality of throughput levels predefined by a network shaping policy.

27. The method of claim 26, wherein the target throughput level corresponds to a minimum throughput level.

28. The method of claim 26, wherein the target throughput level is common across the identified stream pipes.

29. The method of claim 22, wherein:
   each stream pipe is a sub-pipe of a respective one of a plurality of subscriber pipes, each associated with a subscriber terminal, each subscriber terminal associated with a subscriber-level network shaping policy; and
   the adjusting is in accordance with the subscriber-level network shaping policies associated with the respective subscriber pipes.

30. The method of claim 22, wherein:
   each stream pipe is a sub-pipe of a respective one of a plurality of subscriber pipes that has a respective allocated throughput; and
   the adjusting comprises identifying a subset of the plurality of subscriber pipes as presently exceeding their respective allocated throughputs, such that each of the identified subset of stream pipes is a sub-pipe of a respective one of the identified subset of subscriber pipes.

31. The method of claim 26, wherein the target throughput level is determined according to at least one of a network-level network shaping policy, a subscriber-level network shaping policy, or a subscriber cluster-level network shaping policy.

32. The method of claim 22, wherein the identifying comprises inspecting traffic traversing the plurality of stream pipes to determine whether the traversing traffic comprises adaptive traffic.

33. The method of claim 22, wherein the identifying comprises identifying adaptive stream pipes as those of the plurality of stream pipes that are designated a priori for carrying adaptive traffic.

34. A system for network traffic shaping comprising a memory having instructions stored thereon, which, when executed, cause a processor to:
   detect a congestion condition on a communications network indicating congestion on at least one of a plurality of stream pipes that each operates to carry network traffic of an associated traffic type from a content source to one or more subscriber terminals via the communications network,
   the plurality of stream pipes comprising a first stream pipe that operates to carry first network traffic of a first traffic type, and a second stream pipe that operates to carry second network traffic of a second traffic type;

identify a subset of the plurality of stream pipes as carrying adaptive traffic by identifying that at least the first traffic type is encoded in such a way that automatically adapts to throughput of its stream pipe and that the second traffic type is not encoded in such a way that automatically adapts to throughput of its stream pipe, such that the identified subset of stream pipes includes the first stream pipe and excludes the second stream pipe; and adjust allocation of shared network resources of the identified subset of stream pipes in response to the detecting.

35. A system for network traffic shaping, the system comprising:
a plurality of stream pipes that each operates to carry network traffic of an associated traffic type from a content source to one or more subscriber terminals via a communications network; and
a gateway, communicatively coupled with the plurality of stream pipes and disposed in the communications network between the content source and the subscriber terminals, the gateway comprising:
a congestion management system that operates to:
detect a congestion condition on the communications network; and
identify a subset of the plurality of stream pipes as carrying adaptive traffic that is encoded in such a way that automatically adapts to throughput of its stream pipe; and
a traffic shaping system that is communicatively coupled with the congestion management system and operates to adjust allocation of shared network resources of the identified subset of stream pipes in response to detecting the congestion condition, such that the adjusting of allocation of shared network resources of the identified subset of stream pipes is at a first rate, and the adjusting of allocation of shared network resources of any other sub-pipes of their respective subscriber pipes is at a second rate, the first rate being faster than the second rate.

36. A system for network traffic shaping, the system comprising:
a plurality of stream pipes that each operates to carry network traffic of an associated traffic type from a content source to one or more subscriber terminals via a communications network, each stream pipe being a sub-pipe of a respective one of a plurality of subscriber pipes, each associated with a subscriber terminal, each subscriber terminal associated with a subscriber-level network shaping policy; and
a gateway, communicatively coupled with the plurality of stream pipes and disposed in the communications network between the content source and the subscriber terminals, the gateway comprising:
a congestion management system that operates to:
detect a congestion condition on the communications network; and
identify a subset of the plurality of stream pipes as carrying adaptive traffic that is encoded in such a way that automatically adapts to throughput of its stream pipe; and
a traffic shaping system that is communicatively coupled with the congestion management system and operates to adjust allocation of shared network resources of the identified subset of stream pipes in response to detecting the congestion condition in accordance with the subscriber-level network shaping policies associated with the respective subscriber pipes.

37. A method for network traffic shaping, the method comprising:
detecting a congestion condition on a communications network that indicates congestion on at least one of a plurality of stream pipes that each operates to carry network traffic of an associated traffic type from a content source to one or more subscriber terminals via the communications network,
the plurality of stream pipes comprising, at the time of the detecting, a first stream pipe carrying first network traffic of a first traffic type, and a second stream pipe carrying second network traffic of a second traffic type,
each stream pipe being a sub-pipe of a respective one of a plurality of subscriber pipes, each associated with a subscriber terminal, each subscriber terminal associated with a subscriber-level network shaping policy;
identifying a subset of the plurality of stream pipes as carrying adaptive traffic by identifying that at least the first traffic type is encoded in such a way that automatically adapts to throughput of its stream pipe, such that the identified subset of stream pipes includes the first stream pipe and excludes the second stream pipe; and
adjusting allocation of shared network resources of the identified subset of stream pipes in response to the detecting and in accordance with the subscriber-level network shaping policies associated with the respective subscriber pipes.

* * * * *